United States Patent Office 3,238,162
Patented Mar. 1, 1966

3,238,162
POLYMERIZABLE COMPOSITIONS COMPRISING VICINAL SUBSTITUTED ACRYLOXY HYDROXY LONG CHAIN FATTY COMPOUNDS AND VINYLIDENE MONOMERS
Henry M. Walton and Charles S. Nevin, Decatur, Ill., assignors to A. E. Staley Manufacturing Company, Decatur, Ill., a corporation of Delaware
No Drawing. Filed Jan. 24, 1962, Ser. No. 168,541
22 Claims. (Cl. 260—23)

This application is a continuation-in-part of our application Serial No. 126,394, filed June 8, 1961.

This invention relates to copolymers of vinylidene compounds with vicinal acryloxy-hydroxy long chain aliphatic compounds having a carboxyl group (esterified with a monohydroxy compound) on the beta carbon atom of the acryloxy group. The acryloxy-hydroxy compounds are characterized by two structural features: (1) an aliphatic chain having from 10 to 24 carbon atoms, and (2) vicinal acryloxy and hydroxy groups on the aliphatic chain represented by the following formula

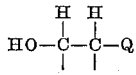

In the above formula, Q is an acryloxy group having on the beta carbon atom a carboxyl group esterified with a monohydroxy compound having no ethylenic unsaturation. These compounds are reaction products of a long-chain vicinal epoxy compound having an average of at least one epoxy group per molecule and a half-ester of an alpha, beta-ethylenically unsaturated alpha, beta-dicarboxylic acid (preferably maleic or fumaric).

Certain homopolymers and copolymers of vicinal acryloxyhydroxy compounds are disclosed in application Serial No. 800,071, filed March 18, 1959, now forfeited. The vicinal acryloxy-hydroxy monomers used in this invention have a carboxy group esterified with a monohydroxy compound on the beta carbon atom of the acryloxy group, which prevents these monomers from homopolymerizing while permitting them to copolymerize with vinylidene compounds such as styrene, methyl methacrylate, vinyl acetate, etc.

An important characteristic of the copolymers of this invention is that their properties can be readily and inexpensively modified by changing the alcohol from which the half-ester of the alpha, beta-ethylenically unsaturated alpha, beta-dicarboxylic acid is made. For example, when the half-ester is based on a lower alcohol, such as isopropanol, copolymerization products of the compounds of this invention with monomers such as styrene, are relatively more rigid than they are when the half-ester is based on a higher alcohol such as ethylhexanol. The flexibility of the copolymers increases as the number of carbon atoms in the alcohol increases. Generally, aryl half-esters form harder copolymerization products than the corresponding alkyl half-esters. On the other hand, the compounds of Serial No. 800,071 can to some extent be modified by substituents on the alpha carbon atom of the acryloxy group. But the introduction of substituents other than methyl is so expensive that other modes of achieving the flexibility in characteristics must be sought.

Further, the beta carboxy ester substituted acryloxy-hydroxy compounds of this invention are generally not more expensive than any of the compounds of Serial No. 800,071. Products based on the isopropyl half-ester of fumaric and maleic acid have a decided cost advantage over any of the products of Serial No. 800,071.

The object of this invention is the provision of novel addition copolymers of vinylidene compounds with vicinal acryloxy-hydroxy long-chain aliphatic compounds having an aliphatic chain of from 10 to 24 carbon atoms, said aliphatic chain having vicinal acryloxy and hydroxy groups, a carboxyl group, esterified with a monohydroxy compound, on the beta carbon atom of the acryloxy group.

A further object of this invention is the provision of novel addition copolymers of vinylidene compounds with glyceride oil reaction products having an aliphatic chain of from 10 to 24 carbon atoms, said aliphatic chain having vicinal fumaryloxy and hydroxy groups, wherein the free carboxyl groups of the fumaryloxy group is esterified with a saturated alcohol of from 1 to 18 carbon atoms.

The vicinal acryloxy-hydroxy long-chain fatty monomers of this invention have the structure

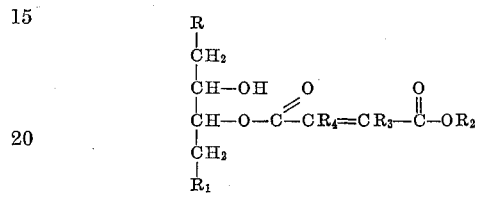

wherein R—CH$_2$—CH—CH—CH$_2$—R$_1$ is an aliphatic open-chain of from 10 to 24 carbon atoms; R is hydrogen or a monovalent aliphatic group; R$_1$ is hydrogen or a monovalent aliphatic group; R$_2$ is an alkyl group (including cycloalkyl) of from 1 to 18 carbon atoms or an aryl group of from 6 to 18 carbon atoms; R$_3$ and R$_4$ are independently hydrogen, lower alkyl or halogen. These compounds are prepared by reacting a long chain fatty epoxy compound having the formula

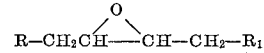

with a half-ester of an alpha, beta-ethylenically unsaturated alpha, beta-dicarboxylic acid having the formula

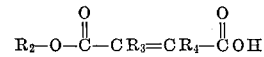

wherein, R, R$_1$, R$_2$, R$_3$ and R$_4$ are defined above.

The vicinal acryloxy-hydroxy long-chain fatty monomers may contain more than one long aliphatic chain and/or more than one vicinal acryloxy-hydroxy group. An example containing multiple long chains and multiple acryloxy-hydroxy groups is obtained by fully epoxidizing a triglyceride containing three unsaturated long-chain acyl groups and then acylating the product with an excess of an acylating half ester such as 2-ethylhexyl hydrogen fumarate. Compounds of this type are particularly useful for preparing cross-linked copolymers of monovinylidene compounds.

They also may contain epoxy groups, ethylenic unsaturation (—CH=CH—), and halogen substituents in the long aliphatic chains. Unsaturation remains if the long chain fatty material is not fully epoxidized, and epoxy groups remain if the acylation is incomplete. Both will occur in the final product if incomplete epoxidation is followed by incomplete acylation of the epoxy groups. Halogen, e.g., chlorine, may be readily introduced by addition to the residual ethylenic double bonds. It may be convenient at times to use this means to eliminate residual ethylenic unsaturation in the vicinal acryloxy-hydroxy compounds or their copolymers.

In somewhat greater detail R and R$_1$ can contain various other groups such as hydroxyl groups, carboxyl groups, carboxylate groups, carbamyl groups, amino groups, nitrilo groups, carbamato groups, halo groups, acryloxy groups, alkoxy groups, aryloxy groups, etc. The preferred long-chain epoxy compounds from which the long chain acryloxy-hydroxy monomers formed are the readily available epoxidized glyceride oils, such as epoxidized soybean oil, epoxidized corn oil, epoxidized castor oil, epoxidized cottonseed oil, epoxidized hempseed oil, epoxidized safflower oil, epoxidized peanut oil, epoxidized linseed oil, epoxidized olive oil, epoxidized cod oil, epoxidized herring oil, epoxidized menhaden oil, etc. Epoxidized esters of other unsaturated long-chain acids are also advantageous starting materials, such as the methyl ester of 9,10-epoxystearic acid, the 2-ethylhexyl ester of 9, 10-12, 13-diepoxystearic acid, the phenyl ester of 5, 6-epoxycapric acid, epoxidized tall oil fatty acid esters, etc.

It may be theorized that some of the thermosetting characteristics of copolymers based on these long chain monomers formed from polyepoxy long chain compounds may be accounted for by ether groups bridging 2 or more of the fatty molecules during the acylation of the polyepoxy compound.

The following are representative of some of the epoxy compounds which can be used to prepare the acryloxy-hydroxy long chain compounds: 4,5-epoxydecane; 9,10-epoxyoctadecane; 9,10-epoxytetracosane; 8,9-epoxy-1-hydroxydecane; 9,10-epoxy-1-hydroxy-octadecane; 9,10-epoxy-6-hydroxy-tetracosane; 4,5-epoxy-1-chlorodecane; 9-10-epoxy-1-bromooctadecane; 9,10 - epoxy-1-chlorotetracosane; 4,5-epoxy-1-nitrilodecane; 9,10-epoxy-1-nitrilooctadecane; 9,10-epoxy-1-nitrilotetracosane; 4,5-epoxy-1-aminodecane; 9,10-epoxy - 1 - methylaminooctadecane; 9,10-epoxy-1-dioctylaminotetracosane; 4,5 - epoxy-1-carbamyldecane; 9,10-epoxy-N-ethyl-1-carbamyloctadecane; 9,10-epoxy-N-dioctyl-1-carbamyltetracosane; 9,10-epoxy-N-dioctyl-1-carbamyltetracosane; 4,5-epoxycapric acid; 9,10-epoxystearic acid; 9,10-epoxyricinoleic acid; 9,10-epoxypentacosic acid; 4,5-epoxy-decyl-1-acetate; 9,10-epoxystearyl stearate; 9,10-epoxy-1-phenoxyoctadecane; 9,10-epoxy-1-propoxyoctadecane; etc.

When R in the preceding formula is substituted by a carboxylate group the substituent can be represented by the formula:

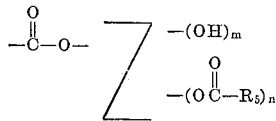

wherein Z is the radical of a hydroxyl compound, $m$ is a number ranging from 0 to 5 and $n$ is a number ranging from 0 to 5, the sum of $m$ and $n+1$ is 1 to 6, the number of hydroxyl groups in the original hydroxyl compound, and each $R_5$ is independently a group selected from the group consisting of hydrogen, monovalent aliphatic groups having from 1 to 24 carbon atoms and monovalent aromatic groups having from 6 to 18 carbon atoms.

The alcohols from which Z in the preceding formula may be derived can contain from 1 to 6 hydroxyl groups and from 1 to 24 carbon atoms. They can be saturated or ethylenically unsaturated. They may be open chain compounds such as n-butanol, glycerol, and sorbitol, or cyclic compounds such as furfuryl alcohol, cyclohexanol, and inositol. Among the suitable alcohols for this purpose are the monohydric alcohols ranging from methyl to lignoceryl, including the isomers in which the hydroxyl groups may be primary, secondary, or tertiary. Among the many suitable dihydric alcohols are ethylene glycol, trimethylene glycol, the polymethylene glycols, and the polyethylene glycols. Additional suitable higher polyhydric alcohols are pentaerythritol, arabitol, mannitol, trimethylol propane, trimethylol ethane, etc.

Suitable esters may also be obtained from aromatic hydroxy compounds such as phenol, the cresols, resorcinol, hydroquinone, naphthol, etc.

Included in the present invention are those compounds wherein the ester consists of a polyhydric alcohol only partially acylated with a long-chain carboxylic acid. Examples of this are the products obtained by fully or partially, epoxidizing monoglycerides and diglycerides containing a suitable unsaturated long-chain acyl group. Also included in the invention are esters wherein the ester is derived from a polyhydric alcohol, acylated in part by other acids. For example, the glyceryl hydroxy groups in the foregoing monoglycerides and diglycerides may be esterified with acids such as acetic acid, benzoic acid, stearic acid, oleic acid, etc.

The following compounds are representative of the various half-esters from which the acryloxy-hydroxy long chain compounds can be formed: methyl hydrogen maleate; methyl hydrogen fumarate; methyl hydrogen mesaconate; methyl hydrogen citraconate; ethyl hydrogen maleate; ethyl hydrogen fumarate; n-propyl hydrogen maleate; isopropyl hydrogen fumarate; n-butyl hydrogen maleate; tertiary-butyl hydrogen fumarate; isoamyl hydrogen fumarate; 4-methyl-2-pentyl hydrogen fumarate; n-octyl hydrogen maleate; 2-ethylhexyl hydrogen fumarate; decyl hydrogen fumarate; lauryl hydrogen maleate; n-tridecyl hydrogen maleate; stearyl hydrogen fumarate; octyldecyl hydrogen maleate; phenyl hydrogen maleate; p-cresyl hydrogen fumarate; benzyl hydrogen maleate; naphthyl hydrogen fumarate; ethyl hydrogen chlorofumarate; cyclohexyl hydrogen maleate; p-cresyl hydrogen maleate; p-chlorophenyl hydrogen maleate; ethoxyethyl (Cellosolve) hydrogen fumarate; p-decylphenyl hydrogen maleate; etc.

Copolymers of the hydroxy-acryloxy compounds based on the fumaric acid half-esters are the most important and preferred copolymers of this invention. This is particularly true of the copolymers based on the alkyl hydrogen fumarates having from 2 to 13 carbon atoms in the alkyl group. In general the copolymers of these hydroxy-fumaroxy compounds form harder and tougher coatings and moldings than the copolymers based on the corresponding maleic acid half-esters.

The physical and chemical characteristics of the new copolymers of this invention can be altered substantially by choice of the starting epoxidized compound, by choice of the half-ester, by the degree or extent of acylation with the half-ester and by choice of vinylidene comonomer. Included among the various vinylidene comonomers are: alkyl esters of alpha, beta-ethylenically unsaturated monocarboxylic acids such as methyl methacrylate, ethyl acrylate, butyl methacrylate and stearyl acrylate; alpha, beta-ethylenically unsaturated monocarboxylic acids such as methacrylic acid and acrylic acid; monovinyl aromatics such as styrene and vinyltoluene; allyl alcohol; vinyl esters such as vinyl acetate and vinyl stearate; acrylonitrile; acrylamide; methacrylamide; vinyl chloride; vinylidene chloride; divinyl benzene; butadiene and the like. Additional ethylenically unsaturated monomers such as maleic acid, crotonic acid, cinnamic acid, dipentene, myrcene and the like can be copolymerized in the presence of one or more vinylidene compounds. The resulting copolymers range from viscous liquids through soft gels to tough rubbery products and hard resins.

Residual unreacted half-ester or diester derived by dismutation therefrom may be present in the long-chain vicinal acryloxy-hydroxy compounds. If present during subsequent addition polymerization, both readily copolymerize with polymerizable alpha, beta-ethylenically unsaturated material to form homogeneous products. If desired, however, the residual half-ester or diester may be removed by vacuum distillation, solvent extraction, by contact with an acid adsorbing resin, etc. Generally, it is preferred that any residual half-ester be left in the polymerizable composition in order to increase the rigidity of the resultant copolymers. Usually the half-ester will comprise from 2 to 30 weight percent of the polymerizable composition.

The vicinal acryloxy-hydroxy compounds of this invention can be copolymerized at a temperature of from about 0° C. to 250° C. with any of the aforementioned vinylidene compounds. While the vicinal acryloxy-hydroxy compound can comprise from about 2 to 95 parts by weight of the polymerizable monomers, and correspondingly the vinylidene monomers comprise from 5 to 98 parts, it is usually preferable that the acryloxy-hydroxy compound long-chain monomer comprise from 30 to 80 weight percent of the polymerizable monomers. Preferably a monovinyl aromatic having the formula

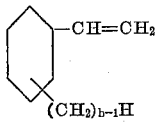

wherein $b$ is a number from 1 to 2, and/or an alkyl ester of an alpha, beta-ethylenically unsaturated monocarboxylic acid comprises from 10 to 70 parts by weight of the polymerizable monomers in order to give the copolymers the best balance between strength and cost. The polymerization can be carried out by reacting the copolymerizable vicinal acryloxy-hydroxy long chain compound and a vinylidene monomer in the presence of a free-radical catalyst in bulk, solution, suspension or emulsion. Typical free radical catalysts, which include the peroxidic catalysts, such as hydrogen peroxide, acetyl peroxide, methyl ethyl ketone peroxide, benzoyl peroxide, tertiary butyl hydroperoxide, potassium persulfate, etc., and azo compounds such as azobisisobutyronitrile, etc., can be used in a concentration of from 0.1% to 10% by weight of the monomers. Accelerators (or driers) such as cobalt naphthenate, cobalt octoate, dimethyl aniline, etc., can be used with the various peroxidic catalysts in a concentration of 0.01 to 10.0 parts by weight of the polymerizable monomers.

The copolymers are useful broadly as protective coatings, textile and paper additives and sizing agents, laminating resins, potting resins, adhesives, etc. They are also useful in the manufacture of cast and extruded objects. The long fatty chain of the vicinal acryloxy-hydroxy monomers makes them particularly well suited as internal plasticizers of polymers of monomers such as styrene and vinylidene chloride.

It will be apparent from the foregoing description that the new acryloxy-hydroxy long chain fatty comonomer of this invention may have one or more acryloxy groups and one or more of the characteristic long-chain alkyl groups. The invention contemplates addition copolymers of vinylidene compounds with (1) the separate molecular species of the defined acylated long-chain aliphatic compounds, (2) mixtures of such molecular species, and (3) the separate or mixed species together with compatible unreacted starting materials and/or compatible side-reaction products thereof.

The following examples are merely descriptive and should not be construed as limiting the scope of the invention.

EXAMPLE I

One and one-half moles of maleic anhydride (147 grams) was weighed into a flask equipped with a stirrer, thermometer, condenser and dropping funnel, and then heated to 105° C. One and one-half moles of methanol (48 grams) was added slowly from the dropping funnel while maintaining the temperature of the reaction mixture at 90–100° C. When sufficient heat was being generated by the reaction, the external heating was discontinued and the temperature rose to 135–140° C. The reaction mixture was allowed to cool to 100° C. and maintained at this temperature for 1 hour. An analytical sample of the reaction product had an acid value of 7.58 meq./g. (theoretical 7.70 meq./g.) and a saponification value of 15.34 meq./g. (theoretical 15.40 meq./g.). Infrared indicated that an essentially pure half-ester of maleic acid had been prepared.

Seventy-three hundredths of a gram of thionyl chloride (0.38% by weight of the half-ester) was added to the reaction vessel and the temperature was maintained at between 90 and 100° C. for twenty minutes. The measured acid value was 8.03 meq./g. and the saponification value was now 15.38 meq./g. Infrared spectrophotometric analysis showed that there had been 95% conversion to the trans isomer, i.e. to methyl hydrogen fumarate.

Three hundred and seventy-five grams of epoxidized soybean oil (having 6.4% oxirane by weight and equal to 1.5 equivalents) was added to the half-ester reaction product in the same vessel, followed by 0.35 gram of basic zinc sulfoxalate formaldehyde. The reaction mixture was heated to 160° C. and maintained there until the oxirane value of the reaction mixture (by HBr-acetic acid titration) was less than 0.01 meq./g. This took approximately 40 minutes. The monomer, which was a mixture of solid and liquid, readily copolymerized with styrene in the presence of a peroxidic catalyst to form a hard, rigid material.

EXAMPLE II

One mole of maleic anhydride (98 grams) was weighed into a flask equipped with a stirrer, thermometer, condenser and dropping funnel and then heated to 110° C. One mole of 2-ethylhexanol (130 grams) was added slowly (approximately 20 minutes) from the dropping funnel while maintaining the reaction mixture at 110° C. The temperature was maintained at 110° C. for forty minutes after the addition of 2-ethylhexanol was complete. Sixty-eight hundredths of a gram of $PCl_3$ (0.005 mole) was added to the reaction mixture, while maintaining the reactants at 110° C. for 12 minutes. Immediately thereafter, two hundred and fifty grams of epoxidized soybean oil containing 6.4% by weight oxirane (1 equivalent) and 0.23 gram of basic zinc sulfoxalate formaldehyde (0.0013 mole) were added to the half-ester reaction vessel. The reactants were maintained at 135° C. until the oxirane value (by HBr-acetic acid titration) was less than 0.10 meq./g. (40 minutes). The product after cooling was a viscous clear pale yellow liquid which had:

| | |
|---|---|
| Acidity, meq./per g. | 0.90 |
| Saponification, meq./per g. | 5.92 |
| Hydroxyl, meq./per g. | 1.50 |
| Trans isomer, percent | 98 |
| Refractive Index $n_D^{45}$ | 1.4710 |
| Viscosity at 25° C., cp. | 28,500 |

Four hundred grams of the product (which contained 20.5 weight percent free 2-ethylhexyl hydrogen fumarate) was copolymerized with 30% by weight styrene (120 grams) using 1% by weight benzoyl peroxide as the catalyst. The copolymer was quite flexible. A comparison of this example with the results of the next four examples is presented in Table 1.

In the preceding example, the maleic acid half-ester is isomerized immediately after its preparation and the fumaric acid half-ester is reacted with the long-chain epoxy compound immediately after the isomerization step. This is the preferred method of carrying out this invention, since the half-esters start to dismutate shortly after their formation. While only a few percent of dicarboxylic acid is formed if the half-ester is stored at room temperature for a week, the presence of varying amounts of dicarboxylic acid in the half-ester reaction mixture affects the reproducibility of the physical properties of the copolymerizable monomers and copolymers thereof. The presence of fumaric acid (M.P. 283°) can be detected visually since fumaric is insoluble in liquid alkyl hydrogen fumarates at moderately elevated temperatures. This insolubility permits a rapid evaluation of whether the fumarate half-esters have sufficient purity or whether the fumaric acid should be filtered off from the half-ester. Accordingly, while it is relatively easy to remove fumaric acid from fumaric acid half-esters, even after prolonged storage we prefer to avoid all purification and isolation steps as pointed out earlier. Therefore, by "immediately" we mean that the fumarate half-ester is prepared and then reacted with the epoxy compound prior to the dismutation of a significant amount of fumaric acid half-ester. However, the smaller the total elapsed time required by isomerization step and reaction with the epoxy compound the more reproducible the final products. A elapsed time of from 10 minutes to 1 hour for these two steps is considered desirable.

EXAMPLE III

Example II was repeated except that 1.54 moles of 2-ethylhexyl hydrogen fumarate was prepared and then reacted with 1 equivalent of epoxidized soybean oil at 135° C. for 45 minutes. The reaction product contained 28.2 weight percent free 2-ethylhexyl hydrogen fumarate.

EXAMPLE IV

Example II was repeated except that 1.25 moles of 2-ethylhexyl hydrogen fumarate was prepared and then reacted with 1 equivalent of epoxidized soybean oil at 135° C. for 30 minutes. The reaction product contained 22.2 weight percent free 2-ethylhexyl hydrogen fumarate.

EXAMPLE V

Example II was repeated except that 0.75 mole of 2-ethylhexyl hydrogen fumarate was prepared and then reacted with 1 equivalent of epoxidized soybean oil at 135° C. for 90 minutes. The reaction product contained 9.3 weight percent free 2-ethylhexyl hydrogen fumarate.

EXAMPLE VI

This example illustrates the isomerization of the reaction product of 2-ethylhexyl hydrogen maleate and epoxidized soybean oil. One and one-quarter mole of maleic anhydride (122.5 grams) was weighed into a flask equipped with a stirrer, thermometer, condenser and dropping funnel and then heated to 110° C. One and one-quarter moles of 2-ethylhexanol (162.5 grams) was added slowly (approximately 25 minutes) from the dropping funnel while maintaining the reaction mixture at 110° C., the temperature was kept at that value for 40 minutes after the addition was complete. Two hundred and fifty grams of epoxidized soybean oil containing 6.4% by weight oxirane (1 equivalent) and 0.23 gram of basic zinc sulfoxalate formaldehyde (0.0013 mole) were added to the half-ester reaction vessel. After the reactants had been maintained at 135° C. for 30 minutes the temperature of the reactants was adjusted to 110° C. Sixty-eight hundredths of a gram of $PCl_3$ (0.005 mole) was added to the reaction mixture, while maintaining the reactants at 110° C. for 12 minutes. The product was then cooled to 60° C.

Four hundred grams of the product (which contained 21.7 weight percent free 2-ethylhexyl hydrogen fumarate) was copolymerized with 30% by weight styrene (120 grams) using a peroxide catalyst. The product was flexible.

based on styrene are stronger if the maleate is isomerized to the fumarate structure prior to reaction with the epoxidized material rather than after the reaction with epoxidized material.

EXAMPLE VII

One mole of maleic anhydride (98 grams) was weighed into a flask equipped with a stirrer, thermometer, condenser and dropping funnel, and then heated to 110° C. One mole of 4-methyl-pentanol-2 (102 grams) was added slowly from the dropping funnel (35 minutes) while maintaining the reaction mixture at 110° C. The temperature was maintained at 110° C. for 40 minutes after the addition of 4-methylpentanol-2 was complete. One and fourteen-hundredths of a grams of $PCl_3$ was added to the reaction mixture, over a ten-minute period while maintaining the reactants at 110° C. Two hundred and fifty grams of epoxidized soybean oil containing 6.4% by weight oxirane (1 equivalent) and 0.23 gram of basic zinc sulfoxalate formaldehyde were added to the half-ester reaction vessel. The reactants were maintained at 135° C. for 40 minutes. The product was then coled to 60° C. The product had 0.08 meq./g. of oxirane oxygen, 19.6 weight percent free methylamyl hydrogen fumarate and 100% trans isomer. A copolymer with 30% by weight styrene was flexible and had a tensile strength of 1,730 p.s.i.

EXAMPLE VIII

Example II was repeated except that 1 mole of decyl alcohol was used in place of 2-ethylhexanol. The product had 0.06 meq./g. of oxirane oxygen, 22.5 weight percent free decyl hydrogen fumarate and 100% trans isomer. A copolymer with 30% by weight styrene had a tensile strength of 1,290 p.s.i.

EXAMPLE IX

Example II was repeated except that 0.85 equivalent of monotridecyl hydrogen fumarate was prepared and then reacted with 1 equivalent of epoxidized soybean oil at 135° C. for 60 minutes. The product had 0.12 meq./g. of oxirane oxygen, 18.9 weight percent free tridecyl hydrogen fumarate and 100% trans isomer. A copolymer with 30% by weight styrene had a tensile strength of 805 p.s.i.

EXAMPLE X

Example I was repeated except that 1.5 moles of isopropyl alcohol was used in place of methanol and the maleic acid half-ester was isomerized at between 60 and 80° C. over a period of 30 minutes using 2 grams of thionyl chloride as isomerization catalyst. The product had 0.01 meq./g. of oxirane oxygen and 98% trans isomer. A copolymer with 33% by weight styrene was clear, hard and rigid.

EXAMPLE XI

One and one-half moles of methyl hydrogen maleate

*Table I*

| Sample | Moles of Half-Ester per Equivalent of Epoxy | Oxirane Oxygen in Meq./g. | Percent Trans Isomer* | Total Sapon. in Meq. | | Tensile Strength of Copolymer with 30% by Weight Styrene in p.s.i. |
| --- | --- | --- | --- | --- | --- | --- |
| | | | | Analytical | Theory | |
| Example II | 1.0 | 0.01 | 100 | 2,892 | 2,852 | 930 |
| Example III | 1.54 | 0.01 | 98 | 3,160 | 3,150 | 2,000 |
| Example IV | 1.25 | 0.02 | 92 | 2,710 | 2,690 | 1,050 |
| Example V | 0.75 | 0.05 | 100 | 2,280 | 2,340 | 925 |
| Example VI | 1.25 | 0.02 | 92 | 2,660 | 2,690 | 745 |

*Percent of the alpha,beta-ethylenically unsaturated dicarboxylic acid which is fumarate.

A comparison of Examples II, III, IV and V indicates that the tensile strength of the copolymer increases as the ratio of half-ester to equivalents of epoxy increases. However, the product becomes more brittle too. A comparison of Examples IV and VI indicates that copolymers was prepared by the method of Example I. The half-ester was then reacted with 375 grams of epoxidized soybean oil at 150° C. for 30 minutes in the presence of 0.35 gram of basic zinc sulfoxalate formaldehyde. The product had only a trace of trans isomer. Half of the product was copolymerized with 33% by weight styrene to form a clear, hard, flexible solid. The remainder of the half-ester-epoxidized oil reaction product was isomerized at 180° C. for 40 minutes in the presence of 2 grams of PCl₃ as catalyst. This product, which had 77% trans isomer, was copolymerized with 33% by weight styrene to form a hard, rigid, clear solid.

EXAMPLE XII

This example illustrated the preparation of a maleate derivative, where no catalyst is employed to open the oxirane ring of the long chain epoxy compound. After 0.2 gram of sodium was dissolved in 4 ml. of ethanol, 16 grams of maleic anhydride was dissolved in the admixture. Nineteen grams of epoxidized soybean oil was added to the reaction mixture and the mixture was heated to between 125 and 140° C. for 1 hour. The clear product of this reaction readily copolymerized with styrene.

EXAMPLE XIII

Example XII was repeated except that the half-ester was reacted at 190° C. for one-half hour with the epoxidized soybean oil. The product of this reaction also readily copolymerized with styrene.

EXAMPLE XIV

Two-tenths of a gram of sodium was added to 10 grams of cyclo-hexanol. After the composition was heated to 110° C., 9.8 grams of maleic anhydride was added. After 30 minutes at this temperature, 24.6 grams of epoxidized soybean oil was added and the reaction mixture was maintained at 120° C. for 1 hour. The clear product of this reaction readily copolymerized with styrene.

EXAMPLE XV

A product copolymerizable with styrene was prepared by the method of Example II except that 18.2 grams of phenyl hydrogen fumarate was reacted for one hour at 140–150° C. in the absence of an oxirane ring opening catalyst with 23.8 grams of epoxidized soybean oil.

EXAMPLE XVI

A product copolymerizable with styrene was prepared by the method of Example II except that 14.4 grams of ethyl hydrogen fumarate was reacted for one hour at 140–150° C. with 31.2 grams of methyl 9,10-epoxystearate in the absence of an oxirane ring opening catalyst.

EXAMPLE XVII

A product copolymerizable with styrene is prepared by the method of Example II except that 390 grams of epoxidized soy fatty acid 2-ethylhexyl esters (1 equivalent of oxirane oxygen) is used in place of the epoxidized soybean oil.

EXAMPLE XVIII

A product copolymerizable with styrene is prepared by the method of Example II except that 364 grams of epoxidized tall oil fatty acid isooctyl ester (1 equivalent of oxirane oxygen) is used in place of the epoxidized soybean oil.

EXAMPLE XIX

A product copolymerizable with styrene is prepared by the method of Example II except that 370 grams of epoxidized soybean oil fatty alcohol (1 equivalent of oxirane oxygen) is used in place of the epoxidized soybean oil.

EXAMPLE XX

Example II was repeated except that 1.5 equivalent of isopropyl hydrogen fumarate was prepared and then reacted with 1 equivalent of epoxidized oil. The product had 20 weight percent free isopropyl hydrogen fumarate and 100% trans isomer. Sixty grams of the above reaction product, 7 grams methacrylic acid and 33 grams styrene were copolymerized at 60° C. using 1% by weight methyl ethyl ketone peroxide and 1% by weight cobalt naphthenate as the catalyst. The copolymer had a Barcol hardness of 72–63 and 69° C. distortion temperature at 66 p.s.i.

EXAMPLE XXI

In the Examples XXI to XXIV a series of copolymers were prepared from the 2-ethylhexyl fumaryloxy-hydroxy soybean oil of Example II of this application and from the methacryloxyhydroxy soybean oil of Example VI of the aforementioned Serial No. 800,071. The results appear below in Table II. The methacryloxy-hydroxy soybean oil was prepared as follows: A slurry of 0.09 gram of zinc dust in 244 grams epoxidized soybean oil (1.0 equivalent of oxirane oxygen) was prepared. Then 0.192 gram of monomethyl ether of hydroquinone was dissolved in 129 grams (1.5 moles) of methacrylic acid (inhibited with 0.025% monomethyl ether of hydroquinone) and added to the epoxidized soybean oil. The mixture was heated with agitation to 128–130° C. and maintained at this temperature for 1.5 hours. The following data was obtained on the cooled product.

| | |
|---|---|
| Free methacrylic acid _____wt. percent__ | 20.0 |
| Oxirane oxygen _____wt. percent__ | 0.25 |
| Saponification value _____meq./g__ | 6.00 |
| Refractive index $n_D^{45}$ _____ | 1.4640 |
| Density, $d_4^{45}$ _____ | 1.035 |
| Viscosity at 25° C. _____poise__ | 28.0 |

One hundred and sixty parts of the methacryloxy-hydroxy soybean oil product (20% by weight free methacrylic acid), 24 parts of the 2-ethylhexyl fumaryloxy-hydroxy soybean oil product (20.5% by weight free 2-ethylhexyl hydrogen fumarate) and 80 parts styrene were polymerized at 60° C. using 2.66 parts benzoyl peroxide.

EXAMPLE XXII

One hundred and sixty parts of the methacryloxy-hydroxy soybean oil product (20% by weight free methacrylic acid), 48 parts of the 2-ethylhexyl fumaryloxy-hydroxy soybean oil product (20.5% by weight free 2-ethylhexyl hydrogen fumarate) and 80 parts styrene were polymerized at 60° C. using 2.88 parts benzoyl peroxide.

EXAMPLE XXIII

One hundred and sixty parts of the methacryloxyhydroxy soybean oil product (20% by weight free methacrylic acid), 41 parts of the 2-ethylhexyl fumaryloxy-hydroxy soybean oil product (20.5% by weight free 2-ethylhexyl hydrogen fumarate), 7 parts 2-ethylhexyl acrylate and 80 parts vinyl-toluene were polymerized at 60° C. using 2.88 parts benzoyl peroxide.

EXAMPLE XXIV

One hundred and sixty parts of the methacryloxy-hydroxy soybean oil product (20% by weight free methacrylic acid), 20 parts of the 2-ethylhexyl fumaryloxy-hydroxy soybean oil product (20.5% by weight free 2-ethylhexyl hydrogen fumarate), 4 parts 2-ethylhexyl acrylate and 80 parts vinyl-toluene were polymerized at 60° C. using 2.88 parts benzoyl peroxide.

*Table II*

| Example | XXI | XXII | XXIII | XXIV |
|---|---|---|---|---|
| Tensile strength in p.s.i. | 6,570 | 5,500 | 5,400 | 6,270 |
| Tensile modulus in p.s.i. | 290,000 | 275,000 | 193,000 | 274,000 |
| Percent Elongation | 9.3 | 19.0 | 19.0 | 16.0 |
| Flexural strength in p.s.i. | 10,200 | 8,820 | 8,070 | 9,702 |
| Flexural modulus in p.s.i. | 237,000 | 205,000 | 199,000 | 236,000 |
| Clash Berg T₄ in ° C. | 84 | 81 | 77 | 84 |
| Heat distortion in ° C. at 66 p.s.i. | 75 | 74 | 67 | 73 |
| Heat distortion in ° C. at 264 p.s.i. | 62 | 57 | 55 | 60 |

EXAMPLES XXV TO XXVIII

Sixty-seven parts of the 2-ethylhexyl fumaryloxy-hydroxy soybean oil product of Example II (20.5% by weight 2-ethylhexyl hydrogen fumarate) was copolymerized with various concentrations of styrene and 2-ethylhexyl acrylate at 65° C. for 16 hours and postcured at 110° C. for 5 hours using 1% by weight benzoyl peroxide. The concentration of styrene and 2-ethylhexyl acrylate is set forth below in Table III.

*Table III*

|  | Parts Styrene | Parts 2-Ethylhexyl Acrylate | Clash Berg $T_4$ in ° C. | Tensile Strength in p.s.i. |
|---|---|---|---|---|
| Example XXV | 29 | 4 | 34 | 1,400 |
| Example XXVI | 27 | 6 | 28 | 1,070 |
| Example XXVII | 25 | 8 | 23 | 755 |
| Example XXVIII | 22 | 11 | 15 | 400 |

The above table indicates that as the concentration of 2-ethylhexyl acrylate in the copolymer increases, the copolymer becomes increasingly more flexible and has a lower tensile strength.

EXAMPLE XXIX

Twenty-five parts of a vicinal hydroxy-mono-2-ethylhexyl fumaroxy long chain aliphatic reaction product prepared by the method of Example II (20% by weight 2-ethylhexyl hydrogen fumarate) and 975 parts styrene were polymerized at 65° C. for 16 hours using 10 parts benzoyl peroxide and then postcured at 120° C. for 0.75 hour. The copolymer was a water clear, very hard, tough, rigid solid.

EXAMPLE XXX

Sixty-seven parts of the reaction product prepared by the method of Example II (19.5% by weight 2-ethylhexyl hydrogen fumarate) and 33 parts methyl methacrylate were polymerized at 65° C. for 16 hours using 1 part benzoyl peroxide and then postcured at 120° C. for 0.75 hour. The copolymer was a pale yellow opaque, soft, low strength, flexible solid.

EXAMPLE XXXI

Sixty-seven parts of the reaction product prepared by the method of Example II (19.5% by weight 2-ethylhexyl hydrogen fumarate) and 33 parts diallyl phthalate were polymerized at 65° C. for 16 hours using 1 part benzoyl peroxide and then postcured at 120° C. for 0.75 hour. The copolymer was a very pale yellow, clear, slightly flexible, hard tough solid.

EXAMPLE XXXII

Sixty-seven parts of the reaction product prepared by the method of Example II (19.5% by weight 2-ethylhexyl hydrogen fumarate) and 33 parts vinyl acetate were polymerized at 65° C. for 16 hours using 1 part benzoyl peroxide and then postcured at 120° C. for 0.75 hour. The copolymer was a clear yellow, slightly flexible, hard, low strength solid.

EXAMPLE XXXIII

Sixty-seven parts of the reaction product prepared by the method of Example II (19.5% by weight 2-ethylhexyl hydrogen fumarate) and 33 parts vinylidene chloride were polymerized at room temperature for two hours using 1 part benzoyl peroxide, 0.6 part methyl ethyl ketone peroxide, 1 part cobalt naphthenate and 1 part N,N-dimethyl aniline and then postcured at 65° C. for 16 hours. The copolymer was a brown, highly viscous fluid.

EXAMPLE XXXIV

Sixty-seven parts of the reaction product prepared by the method of Example II (19.5% by weight 2-ethylhexyl hydrogen fumarate) and 33 parts acrylonitrile were polymerized at room temperature for 2 hours using 1 part benzoyl peroxide, 0.6 part methyl ethyl ketone peroxide, 1 part cobalt naphthenate and 1 part N,N-dimethyl aniline and then postcured at 65° C. for 16 hours. The copolymer was a yellowish brown, soft, putty-like solid.

EXAMPLE XXXV

Sixty-five parts of the reaction product prepared by the method of Example II (19.5% by weight 2-ethylhexyl hydrogen fumarate), 10 parts methacrylic acid and 25 parts vinyl acetate were polymerized at room temperature for 2 hours using 1 part benzoyl peroxide and 1 part N,N-dimethyl aniline and then postcured at 65° C. for 16 hours. The copolymer was an opaque yellowish brown, soft gel-like, low strength solid.

EXAMPLE XXXVI

Seventy-five parts of the reaction product prepared by the method of Example II (19.5% by weight 2-ethylhexyl hydrogen fumarate) and twenty-five parts ethyl acrylate were polymerized at room temperature for 2 hours using 1 part benzoyl peroxide and 1 part N,N-dimethyl aniline and then postcured at 65° C. for 16 hours. The copolymer was a clear bright red, soft gel-like, low strength solid.

EXAMPLE XXXVII

Seventy-five parts of the reaction product prepared by the method of Example II (19.5% by weight 2-ethylhexyl hydrogen fumarate) and 25 parts methacrylic acid were polymerized at 65° C. for 16 hours using 1 part benzoyl peroxide and then postcured at 120° C. for 0.75 hour. The copolymer was an opaque pale yellow, low strength rigid solid.

EXAMPLE XXXVII

Sixty-five parts of the reaction product prepared by the method of Example II (19.5% by weight 2-ethylhexyl hydrogen fumarate), 25 parts methyl methacrylate and 10 parts methacrylic acid were polymerized at 65° C. for 16 hours using 1 part benzoyl peroxide and then cured at 120° C. for 0.75 hour. The copolymer was a hazy light yellow, soft, flexible, low strength solid.

Since many embodiments of this invention may be made and since many changes may be made in the embodiments described, the foregoing is to be interpreted as illustrative only and our invention is defined by the claims appended hereafter.

We claim:
1. An addition polymerizable composition comprising from 2 to 30 parts by weight of an alkyl half-ester of fumaric acid having from 1 to 18 carbon atoms in the alkyl group, from 10 to 70 parts by weight of a vinylidene monomer selected from the group consisting of monovinyl aromatics, alkyl esters of alpha, beta-ethylenically unsaturated monocarboxylic acids and mixtures thereof, and from 30 to 80 parts by weight of a glyceride oil having an esterified aliphatic fatty acid chain of from 10 to 24 carbon atoms said aliphatic chain having vicinal fumaryloxy and hydroxy groups, wherein the free carboxyl group of the fumaryloxy group is esterified with a saturated alcohol having from 1 to 18 carbon atoms.

2. The addition polymerizable composition of claim 1, wherein the monovinyl aromatic is styrene.

3. The addition polymerizable composition of claim 1, wherein the saturated alcohol is 2-ethylhexanol.

4. The addition polymerizable composition of claim 1, wherein the saturated alcohol is isopropanol.

5. The addition polymerizable composition of claim 1, wherein the saturated alcohol is methyl pentanol.

6. An addition polymerizable composition comprising from 5 to 98 parts by weight of a vinylidene monomer and from 95 to 2 parts by weight of a long chain fatty compound having an aliphatic chain of from 10 to 24 carbon atoms, said aliphatic chain having internal vicinal acryloxy and hydroxy substituents, and said acryloxy substituent having attached to the beta carbon atom thereof a

group, wherein $R_2$ is selected from the class consisting of an alkyl group having from 1 to 18 carbon atoms and an aryl group having from 6 to 18 carbon atoms.

7. An addition polymerizable composition comprising from 5 to 98 parts by weight of a vinylidene monomer and from 95 to 2 parts by weight of a long chain fatty acid ester having an esterified aliphatic fatty acid chain of from 10 to 24 carbon atoms, said aliphatic fatty acid chain having internal vicinal acryloxy and hydroxy substituents, and said acryloxy substituent having attached to the beta carbon atom thereof a

group, wherein $R_2$ is selected from the group consisting of an alkyl group having from 1 to 18 carbon atoms and an aryl group having from 6 to 18 carbon atoms.

8. The copolymerizable composition of claim 7, wherein said vinylidene monomer comprises a vicinal methacryloxy-hydroxy glyceride oil.

9. The composition of claim 7, wherein said vinylidene monomer is selected from the group consisting of monovinyl aromatics, alkyl esters of alpha, beta-ethylenically unsaturated monocarboxylic acids and mixtures thereof.

10. The composition of claim 7, wherein said long chain fatty acid ester is a glyceride oil.

11. An addition polymerizable composition comprising from 5 to 98 parts by weight of a vinylidene monomer and from 95 to 2 parts by weight of a long chain fatty acid ester having an esterified aliphatic fatty acid chain of from 10 to 24 carbon atoms, said aliphatic fatty acid chain having internal vicinal fumaryloxy and hydroxy groups, wherein the free carboxyl group of the fumaryloxy group is esterified with a saturated alcohol having from 1 to 18 carbon atoms.

12. The process of preparing a copolymer which comprises polymerizing the composition of claim 6 under free radical polymerization conditions.

13. The process of preparing a copolymer which comprises polymerizing the composition of claim 7 under free radical polymerization conditions.

14. The process of preparing a copolymer which comprises polymerizing the composition of claim 8 under free radical polymerization conditions.

15. The process of preparing a copolymer which comprises polymerizing the composition of claim 9 under free radical polymerization conditions.

16. The process of preparing a copolymer which comprises polymerizing the composition of claim 10 under free radical polymerization conditions.

17. The process of preparing a copolymer which comprises polymerizing the composition of claim 11 under free radical polymerization conditions.

18. The process of preparing a copolymer which comprises polymerizing the composition of claim 1 under free radical polymerization conditions.

19. The process of preparing a copolymer which comprises polymerizing the composition of claim 2 under free radical polymerization conditions.

20. The process of preparing a copolymer which comprises polymerizing the composition of claim 3 under free radical polymerization conditions.

21. The process of preparing a copolymer which comprises polymerizing the composition of claim 4 under free radical polymerization conditions.

22. The process of preparing a copolymer which comprises polymerizing the composition of claim 5 under free radical polymerization conditions.

References Cited by the Examiner

UNITED STATES PATENTS 2,934,516   4/1960   Hicks _____ 260—23

LEON J. BERCOVITZ, *Primary Examiner.*